United States Patent [19]
Au

[11] Patent Number: 5,297,913
[45] Date of Patent: Mar. 29, 1994

[54] SPARE TIRE HOIST AND CARRIER

[76] Inventor: Fernando Au, 3521 W. Mangold, Greenfield, Wis. 53221

[21] Appl. No.: 994,767

[22] Filed: Dec. 22, 1992

[51] Int. Cl.⁵ .............................. B62D 43/10
[52] U.S. Cl. ........................ 414/463; 224/42.21; 224/42.23; 224/42.24
[58] Field of Search ............... 224/42.12, 42.21, 42.23, 224/42.24; 414/463

[56] References Cited
U.S. PATENT DOCUMENTS 3,390,864  7/1968  Searcy et al. ............... 414/463 X
3,866,777  2/1975  Staranick et al. ............ 224/42.21 X
4,329,107  5/1982  Smith ................................ 414/463
4,492,506  1/1985  Haagland et al. ............. 224/42.21

Primary Examiner—Michael S. Huppert
Assistant Examiner—Janice Krizek
Attorney, Agent, or Firm—Ryan, Kees & Hohenfeldt

[57] ABSTRACT

The vehicle undercarriage spare tire carrier wherein the tire is lifted by a lever arm. A yieldable resilient connection is provided to attach an end of the cable that lifts the tire so that the effective lever arm operating on the cable to lift the tire is shortened as the tire is lifted thereby increasing the ease of lifting the tire.

6 Claims, 1 Drawing Sheet

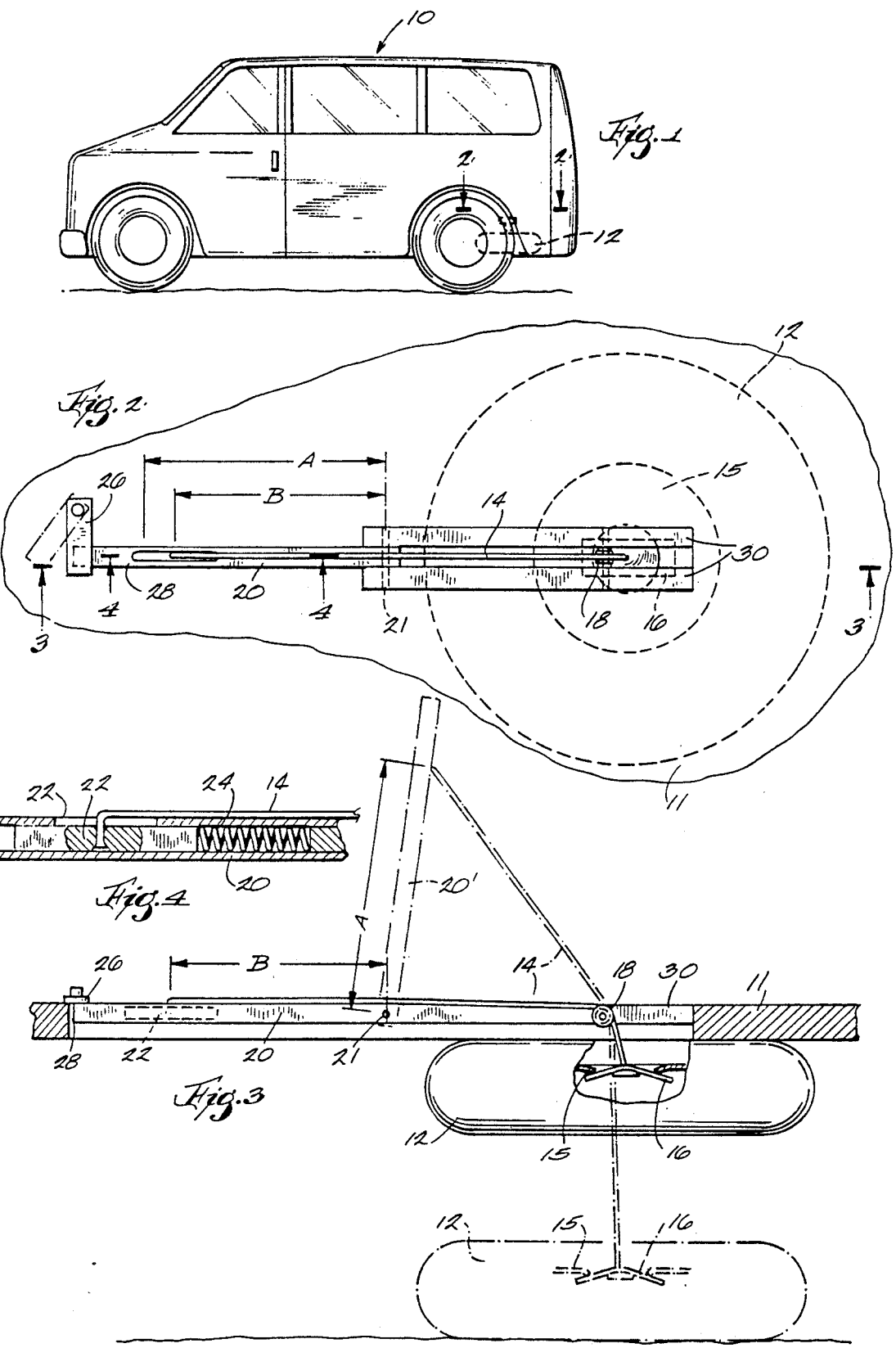

SPARE TIRE HOIST AND CARRIER

BACKGROUND OF THE INVENTION

1. Field of the Invention

The present invention relates to a motor vehicle spare tire lifting and retaining mechanism. More particularly the invention relates to an improved mechanism utilizing a cable to lift and stow a spare tire beneath the floor of a vehicle such as a minivan.

2. Background Art

Spare tires are generally mounted beneath the floor of the rear compartment of a minivan or similar vehicle. Mechanisms currently in use for lifting and retaining a spare tire beneath the floor of such a vehicle generally involve the use of a crank to wind the cable on a drum. In order to obtain sufficient leverage to permit an operator of a vehicle to turn the crank, the drums involved are small resulting in the need to continue cranking for a long period of time to either lower or raise the tire. Smith U.S. Pat. No. 4,329,107 issued May 11, 1982 suggests the use of a lever arm located on a pickup truck bumper to lift a spare tire beneath the bed of a pickup truck. However, because of the long lever arm required by such a mechanism, a great deal of force is required in order to move the lever handle to the over center or "breakover" position. Conversely, when the tire is being lowered, the leverage exerted by the weight of the tire can cause the lever handle to whip around and strike the operator possibly causing injury.

In view of these and other shortcomings of currently available devices, a need has continued to exist for an improved mechanism for lifting and retaining tires.

SUMMARY OF THE INVENTION

It is the principal object of the present invention to provide an improved mechanism for lifting and retaining a spare tire under a motor vehicle utilizing a wire cable. One aspect of the invention involves providing such a mechanism wherein the lifting handle can be positioned in a cavity in the motor vehicle floor so that the top of the mechanism is flush with the surface of the floor.

Another aspect of the invention involves provision of a mechanism wherein a lever arm is utilized to lift the tire but in connection with which the amount of force required to either lift the tire or to lower it gently to the ground is minimized. A related aspect of the invention involves providing such a mechanism wherein the effective lever arm exerted by the lever handle lifting the cable shortens as tension is applied to the cable during lifting of the tire.

These and other aspects and advantages of the invention are achieved by the vehicle spare tire lifting and retaining device of this invention that includes a flexible cable connected at one end to the hub of a spare tire of the vehicle. The cable passes upwardly through an opening in the bottom surface of the vehicle which may be the floor of a minivan of cargo box of a truck. A pulley over which the cable is reeved is located adjacent to the opening. A lever arm is pivotally connected to the floor of the vehicle and the end of the cable opposite the tire is attached to the lever arm at a point displaced from the pivotal connection.

Means are provided on the lever arm to resiliently yieldably attach the end of the cable to the arm. The resilient means, preferably a coiled spring, is biased to urge the attachment means toward the free end of the arm so that the point of connection of the cable to the arm moves toward the pivotal connection when the arm is rotated about the connection point to raise the tire. A latch is provided to retain the free end of the lever arm in a position substantially parallel to the plane of the motor vehicle floor.

Preferably the arm and the pivotal connection are located in a recess in the floor of the rear of the vehicle so that when the tire is raised, the top surface of the arm is essentially flush with the plane of the top surface of the floor. The lever arm is preferably formed of a square cross sectioned metal tube having an opening in one side, the biasing spring and attachment block for the cable being slidably located within the tube.

The invention will be set forth in greater detail in the following detailed description and accompanying drawings.

DRAWINGS

FIG. 1 is a side elevational view of a minivan showing the location of the device of the present invention by means of phantom lines;

FIG. 2 is a fragmentary top view taken along line 2—2 of FIG. 1 with the position of hidden parts shown by phantom lines;

FIG. 3 is a side cross-sectional view taken along line 3—3 of FIG. 2 with the position of the component parts when the tire is lowered shown by means of phantom lines; and FIG. 4 is an enlarged cross-sectional view taken along line 4—4 of FIG. 2.

DETAILED DESCRIPTION

Referring to FIG. 1 there is seen a minivan 10 having a spare tire 12 mounted under the floor 11 of the rear compartment thereof. In the stowed position tire 12 is firmly secured against the bottom of floor 11 as seen in FIGS. 2 and 3. When the tire 12 is needed it is lowered to the ground as shown by phantom lines in FIG. 3.

Tire 12 is supported under the vehicle by means of a cable 14 generally of the commonly used wire rope type. Cable 14 is connected to the center of tire rim 15 by means of a clip 16 of conventional design. Clip 16 is centrally attached to the end of cable 14 and is preferably of a rectangular upwardly centrally angled configuration as shown. This conventional angled configuration causes clip 16 to be self centering in the center of rim 15.

Cable 14 as shown is threaded over a pulley 18 and the opposite end connected to a lever 20. One end of lever 20 is pivotally connected to the floor of the vehicle by means of a pin or bolt 21. The end of cable 14 opposite that connected to clip 16 is resiliently connected to lever arm 20 by the arrangement shown in FIG. 4. A block 22 slidably mounted within arm 20 is accessible through an opening 23 in the upper surface of lever arm 20. The preferred configuration for lever arm 20 is of a hollow square cross sectioned metal tube. As seen in FIG. 4 an end of block 22 bears against a coil spring 24 or similar resilient member.

Spring 24 biases the end of cable 14 toward the end of lever 20. Thus when the cable is relaxed or if the load of the lever arm in pulling the cable exerts a moment more or less perpendicular to the longitudinal axis of the lever arm as is the case approximately to the point shown in FIG. 3 by phantom lines, the biasing of spring 24 causes the point of attachment of cable 14 to lever arm 20 to be a distance A away from pivot point 21. Then, when the lever arm is rotated counter-clockwise as seen in FIG. 3 from the position shown by phantom lines, a greater moment is exerted parallel to the axis of lever arm 20. This moment causes compression of spring 24 so that the effective lever arm is shortened to distance B as seen in FIGS. 2 and 3. This shortening of the lever arm increases the amount of leverage available to the user in raising the tire. This improvement of the leverage lightens the work effort required to lift the tire, thus making it easier for an operator of limited physical strength to raise the tire. The spring also makes it easier for the lever arm to be moved to an overcenter position wherein the cable is pulling linearly parallel to the axis of lever arm 20 as seen in FIG. 3. Finally, the presence of spring 24 in the compressed state when the tire is raised insures that the tire is firmly mounted against the bottom of the motor vehicle floor 11.

A latch member 26 is provided to insure that the arm 20 remains in the position of FIG. 3 wherein it is located in a recess 28 in the floor of the rear of the vehicle 10. The mechanism thus remains concealed, particularly if covered by carpeting or matting. While latch 26 is indicated to be of a simple pivoting type, it will readily be apparent that other latches of various types such as sliding types or hooks can be substituted by those skilled in the art. Preferably the sides of the opening in the motor vehicle floor are reinforced by members such as angle irons 30 in order to provide adequate support for pulley 18.

While preferred embodiments of the invention have been indicated for purposes of illustration, it will be apparent to those skilled in the art that various other modifications can be made without departing from the spirit of the invention or scope of the appended claims.

What is claimed is:

1. A motor vehicle spare tire lifting and retaining device comprising a flexible cable having means on one end thereof to attach the same to the spare tire of the vehicle, said cable passing upwardly through an opening in the bottom surface of the motor vehicle, a pulley located adjacent said opening, a lever arm pivotally connected to the floor of said motor vehicle at a pivotal connection, the end of said cable opposite said tire being attached to said lever arm at a point displaced from said pivotal connection, and means on said lever arm to resiliently yieldably attach said end of said cable to said arm, said resilient attachment means being biased toward the free end of said arm so that the point of attachment of said cable to said arm moves toward said pivotal connection when said arm is rotated about said pivotal connection to raise said tire.

2. A device according to claim 1 wherein a means is provided to latch the free end of said lever arm in a position substantially parallel to the plane of said motor vehicle bottom surface.

3. A device according to claim 1 wherein said motor vehicle is a minivan and said arm and said pivotal connection are located in a recess in the floor of the rear of said minivan so that when the tire is raised, the top surface of said arm is essentially flush with the plane of the top surface of said floor.

4. A device according to claim 3 wherein the means to attach said one end of said cable to said spare tire is a metal clip angled toward the center thereof, said cable being attached to said center whereby said cable becomes centered in the hub of said tire when said tire is raised.

5. A device according to claim 1 wherein said lever arm is of a tubular metal construction of square cross section having an opening in one side thereof, an attachment block being slidably located within said tube, said cable end being connected to said block, and biasing means urges said block toward the free end of said arm.

6. A device according to claim 1 wherein said biasing means comprises a coil spring located within the interior of said lever arm.

* * * * *